May 15, 1962   J. E. STARR   3,034,346
COMPENSATION OF STRAIN GAUGE TRANSDUCER NON-LINEARITY
Filed Dec. 1, 1960

INVENTOR.
James E. Starr.
BY
ATTORNEY

United States Patent Office 3,034,346
Patented May 15, 1962

3,034,346
COMPENSATION OF STRAIN GAUGE TRANS-DUCER NON-LINEARITY
James E. Starr, Cumberland, Md., assignor to The Budd Company, Philadelphia, Pa., a corporation of Pennsylvania
Filed Dec. 1, 1960, Ser. No. 72,988
3 Claims. (Cl. 73—141)

This invention pertains to means and methods for compensation of strain gauge transducer non-linearity, particularly as applied to load cells of the type wherein spring element load strains are sensed by bonded resistance strain gauges interconnected to form a bridge network.

It is conventional in the load cell art to employ a spring element which is deformed during application of loads to be measured and to sense the spring element deformations by means of bonded resistance strain gauges applied to a gauged-strain surface of the spring element. It is obviously advantageous to achieve load cell outputs which are linearly dependent upon applied loads, and independent of temperature, load range, and other extrinsic conditions. Generally, the sensing strain gauges are interconnected into a four-arm bridge network having one set of opposite-arm strain gauges arranged to sense load strains and the other set of opposite-arm strain gauges arranged to sense Poisson strains concomitant with the load strains. Such an arrangement allows for inherent temperature compensation of the bridge output.

Some non-linearities usually remain, however, in the relationship between bridge output and load strain magnitude, and in the high precision applications of present-day load cells, these non-linearities cannot be ignored. They are due primarily to two effects: the first, which has been attacked by prior art expedients, is the change in elastic modulus E of the load cell material as a function of ambient temperature; the second, for which there has been no previous practical systemic correction, is alteration of spring element cross-sectional area, a second order effect of spring element loading.

Therefore, it is a general object of this invention to provide means and methods for the compensation of load cell output non-linearities.

A specific object is to provide load cell output compensation for load dependent cross-sectional area variations of a load cell spring element.

A further specific object is to provide improved load cell spring element strain gauging means and methods yielding inherent compensation for both temperature dependent elastic modulus and load dependent cross-sectional area variations of the spring element.

While the novel features of this invention are particularly pointed out in the appended claims, a better understanding together with additional objects and advantages thereof will be had upon consideration of the following specification taken in conjunction with the accompanying drawing wherein:

Figure 1:
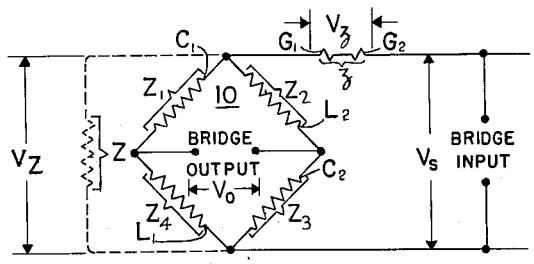
FIG. 1 is an elementary diagram of the active impedances of a load cell spring element strain gauge bridge network according to this invention.

The elementary diagram of FIG. 1 represents a conventional Wheatstone-Christie bridge 10 with a compensating impedance $z$ serially inserted in the input circuit. Impedance $z$ is variable and has a specific function according to this invention as more fully explained hereinafter. For a given potential difference $V_Z$ maintained across the equivalent impedance Z of the bridge 10, the bridge output will be zero when respective bridge arm impedances $Z_1$, $Z_2$, $Z_3$, $Z_4$ are equal. When the bridge is unbalanced, an output voltage $V_0$ will be generated proportional to difference of resistance changes in any two adjacent arms, or proportional to the summation of resistance changes in any two opposite arms. The output voltage $V_0$ is a linear function of the input diagonal potential $V_Z$, assuming the bridge output impedance to be very large. Potential $V_Z$ is the difference between source voltage $V_S$ and the potential drop $V_z$ across the series impedance $z$. Therefore, output voltage $V_0$ may be seen also as dependent upon the magnitude of $z$.

Figure 2:
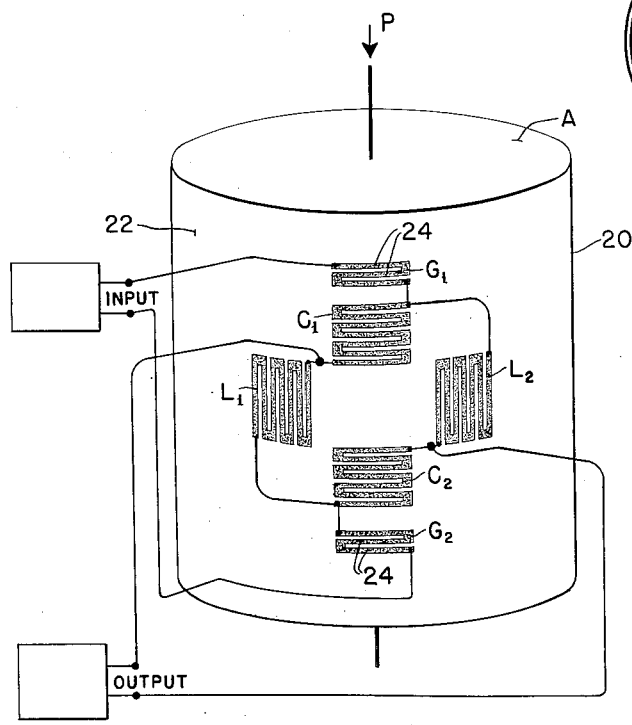
FIG. 2 is a pictoral illustration of an application of of the FIG. 1 network to a load cell spring element.

Impedances $Z_1$, $Z_2$, $Z_3$, and $Z_4$ may be considered as the respective resistances of strain sensitive resistors, or strain gauges, $C_1$, $L_2$, $C_2$, and $L_1$ and the impedance $z$ may be considered as the summed resistance of correction resistors, or correction strain gauges, $G_1$ and $G_2$ as more fully identified in connection with description of FIG. 2. It should be realized that the impedance $z$ serially inserted in the input circuit is not affected by its allocation between discreet resistive elements $G_1$ and $G_2$, whether on the same or opposite sides of the bridge 10, so long as $G_1$ and $G_2$ are in series in the input circuit.

In FIG. 2, a load cell spring element 20 is represented as a right cylindrical column having a longitudinal axis along which variable compressive load P is applied. Load P is assumed to be equally distributed over the cross-sectional area A of spring element 20. The spring element will be deformed, strained, longitudinally as a function of applied load P and concomitant lateral Poisson strains will produce circumferential deformation of the cylindrical gauged strain surface 22.

Construction of the strain gauge bridge circuit represented in FIG. 1 may be accomplished by the adhesive bonding of resistance strain gauges $L_1$, $L_2$, and $C_1$, $C_2$ to gauge strain surface 22 with the sensitive directions of the gauges of each pair respectively paralleling the longitudinal and circumferential surface strain directions. These gauges, each having a nominal impedance Z, are alternately interconnected to form the conventional four-arm bridge network.

Additional correction strain gauges $G_1$ and $G_2$, having a total nominal impedance $z$, are provided according to this invention in series with one of the load cell diagonals, e.g., the input diagonal. Compensating gauges $G_1$ and $G_2$ are applied as ordinary bonded resistance strain gauges but have material characteristics defined according to this invention so as to provide for substantial compensation of non-linearities ordinarily present in the output of the conventional strain gauge bridge network.

With further reference to the FIG. 1 diagram and the pictoral representation of FIG. 2, optimum strain gauge transducer operation may be described according to:

$$V_o = kV_Z e \qquad \text{I}$$

where $V_0$ is the bridge output voltage, $V_Z$ the potential maintained across the bridge input diagonal, $e$ the load strain, and $k$ a constant of proportionality. Since $e$ is a function of unit stress $s$ and elastic modulus E of the spring element, Equation I may be rewritten as:

$$V_o = kV_Z s/E \qquad \text{II}$$

Prior load cell developments were based upon a linear relationship between $s$ and $P$ according to:

$$s = P/A \qquad \text{III}$$

wherein $A$, the lateral cross-sectional area of the spring element was assumed invariant.

While the latter equation is sufficiently correct for some load cell applications, it is the basis for significant errors, where maximum precision is required. Upon strict analysis, the factor $A$ in Equation III has been found to be a function of load $P$ and of the no-load cross-sectional area $A_0$:

$$A = F(A_0, P) \qquad \text{IV}$$

Therefore, Equation III should be corrected to read:

$$s = P/(A_0 + \Delta A) \qquad \text{V}$$

because load dependent area increment $\Delta A$ must be considered.

Figure 3:
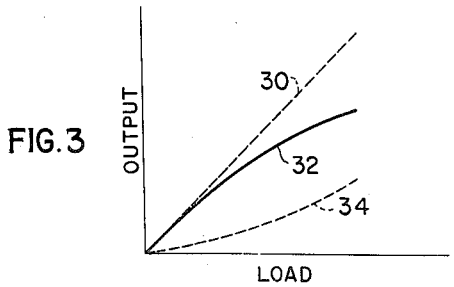
FIG. 3 is a graph of load cell output versus applied load.

FIG. 3 is a graphical illustration of relationships between spring element strain gauge bridge circuit output signal magnitudes and load magnitudes. Constant slope curve 3 illustrates the desired linear relationship between output and load. However, with most prior load cell sensing circuits, the actual curve 32 falls away from curve 30 as spring element load is increased. While the slope change of curve 32 is greatly magnified in FIG. 3, the non-linearity is significant and must be tediously corrected for in many precision applications. Curve 34 indicates the amount of output correct versus increasing load which must be added to curve 32 to achieve the optimum linear output-load relationship of curve 30. The indicated correction is substantially provided for according to this invention through the operation of correcting strain gauges $G_1$ and $G_2$ by their complementary effect upon the input potential $V_Z$ to the strain gauge bridge input diagonal. The shape of curve 34 may, therefore, be scaled to indicate the desired variation of potential $V_Z$ to be provided for by the operation of correcting strain gauges $G_1$ and $G_2$.

Figure 4:
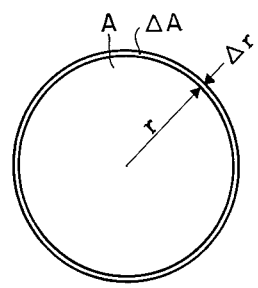
FIG. 4 is a diagram illustrating cross-sectional area changes of the FIG. 2 spring element during loading.

FIG. 4 illustrates a solution for $s$ of Equation V for the simple case of the cylindrical load cell spring element of no-load cross-sectional area $A$. For any longitudinal load strain (normal to the plane of the paper) there is a concomitant Poisson strain at right angles to the load strain resulting in an increase $\Delta r$ of the radial dimension $r$. The additional increment in the area over which the longitudinal load is actually applied is then:

$$\Delta A = 2\pi r \Delta r \qquad \text{VI}$$

and $\Delta r$ is given by:

$$\Delta r = -\mu r s / E \qquad \text{VII}$$

where $\mu$ is Poisson's ratio for the load cell spring element material and $s$ is the normal stress as defined in Equation III. Upon substitution of Equations VI and VIII, Equation V may be rewritten as:

$$s = P/A(1 - \mu s/E) \qquad \text{VIII}$$

Equation VIII is a quadratic having the indicated solutions:

$$s = (1 \pm \sqrt{1 - 8\mu P/EA})/(4\mu/E) \qquad \text{IX}$$

wherein the choice of signs depends upon whether load $P$ is a tensile or a compressive load. It is, therefore, apparent that the unit stress $s$ of Equation II should be treated as a variable function of applied load $P$ and must be corrected for in order to obtain a strain gauge transducer output which is linearly related to applied load magnitudes.

According to this invention, the required compensation is made the function of a load dependent variable impedance $z$ in series between the load cell bridge circuit and the exciting source $V_S$. Although not a strict requirement, the series impedance $z$ is illustrated as divided into two equal parts $G_1$ and $G_2$ symmetrically oriented on the gauge strain surface 22 in the pictoral representation of FIG. 2. The correcting strain gauge resistances are, therefore, varied in proportion to surface strains parallel with the circumferentially oriented gauge filaments 24.

By following through the previously developed relationships in reverse order, it can be seen that each successive incremental increase in compressive load $P$ results in a lesser increase in the longitudinal unit stress $s$. This results, in turn, in the second order decrease in the ratio of output $V_0$ to load $P$ shown at 32 in FIG. 3. Correction of this slope change is accomplished by the following action of correcting strain gauges $G_1$ and $G_2$.

While other orientations and materials may be combined to produce the desired connection, strain gauges $G_1$ and $G_2$ may be of a material, such as nickel, which has a negative gauge factor. The impedance $z$ is decreased when such gauges are subjected to an increasing tensile strain.

Upon further reference to the elementary diagram of the FIG. 1, it will be apparent that $V_Z$ is a function of source voltage $V_S$ of correcting strain gauge impedance $z$ according to:

$$V_Z = V_S Z/(Z+z) \qquad \text{X}$$

and, therefore, decreasing $z$ as a function of increasing load, increases $V_Z$ correspondingly. Bridge output $V_0$ is directly proportional to $V_Z$ and is also increased by decreasing $z$. It will be apparent, therefore, that the load output correction indicated by curve 34 of FIG. 3 is provided for by the prescribed load dependence of $z$. While it will not be generally possible to reproduce correction curve 34 exactly, any remaining non-linearities in the output-load relationship may be made smaller than errors from other sources in any real load cell application.

It will be apparent then that upon proper selection of gauge factor, nominal impedance, and orientation, the series insertion of correction strain gauges $G_1$ and $G_2$ will provide substantially full compensation of load cell output linearities due to load dependent lateral cross-sectional area variations of the load cell spring element.

A greatly simplified spring element has been chosen for the illustrated example. In actual practice, however, much more sophisticated spring element designs are employed to provide stress concentrations at the positions of the active strain gauges, to provide for desired spring element deflection to gauge strain ratios, and to satisfy other extrinsically imposed conditions. Exact solution of the parametric relationships for these spring elements becomes mathematically tedious. However, by assuming the relationships stated in Equations V to IX above to hold for the more complicated spring element designs, a qualitative statement of the desired correction action may be had. Thereafter, it is most efficient to determine empirically the best prescription for the parameters of correction gauges $G_1$ and $G_2$.

A very important consideration urging empirical solution is that in Equation II above, an additional assumed constant factor is actually a variable. The elastic modulus $E$ of the spring element material is significantly temperature dependent. In general, $E$ varies inversely with temperature and hence $V_0$ for a given load can be expected to vary directly with temperature. By a proper choice of the parameters of correcting strain gauges $G_1$ and $G_2$, this temperature dependence can be corrected for simultaneously with the area correction.

According to a preferred embodiment of this invention, the material of correcting strain gauges $G_1$ and $G_2$ is chosen from those materials which have a significant temperature coefficient of resistivity. This temperature coefficient should usually be positive so that the impedances comprising $z$ increase with temperature resulting in a decrease in input diagonal bridge excitation voltage $V_Z$ and, hence, an opposite effect upon bridge output voltage $V_0$ to compensate for the increasing effect on $V_0$ of the inverse temperature dependence of elastic modulus E of the spring element material. Nickel, which has the desired negative gauge factor described above, also has a high temperature coefficient of resistivity and is the preferred material for correcting gauges $G_1$ and $G_2$.

It will ordinarily be convenient to first choose the material of the correcting gauges and their nominal impedance to satisfy the requirements of their elastic modulus compensating function and thereafter to choose gauge orientation in order to satisfy the requirements of their area change compensation function.

Figure 5:
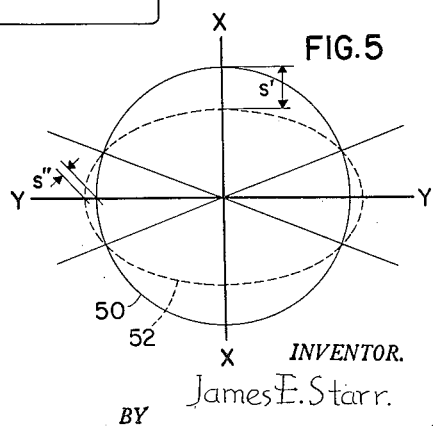
FIG. 5 illustrates directional dependence of the resultant of load and Poisson strains at the surface of the FIG. 2 spring element.

The aforementioned seemingly mutually exclusive conditions can be satisfied because of the spring element surface strain relationships diagrammed in FIG. 5. Therein, it is assumed that circle 50 is scribed on surface 22 of load cell spring element 20 of FIG. 2. The load strain direction is parallel with XX and the Poisson strain direction is parallel with YY. During application of a compressive load strain the assumed circle 50 will be deformed into an ellipse 52 and surface strain magnitudes will vary from a positive maximum $s'$ along the XX direction to a negative maximum $s''=-\mu s'$ along the YY direction. Therefore, by choosing the angular orientation of the sensitive direction of the correcting strain gauges $G_1$ and $G_2$, a wide range of relationships between $z$ and $P$ are available for a predetermined relationship between $z$ and temperature $t$.

In summation, the output of strain gauge transducers, of the type in which an array of bonded resistance strain gauges is electrically connected between an input means and an output means and mechanically attached to a gauged strain surface of a spring element adapted to be deformed during application of an applied load, may be substantially corrected for non-linearities due to spring element cross-sectional area variations by electrical insertion of a correcting strain gauge between the transducer input and output in series with the equivalent impedance of the array and by mechanical attachment of the correcting strain gauge to the gauged strain surface of the transducer parallel with a surface strain resultant which varies with the magnitude of the applied load.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A load cell spring element strain gauge bridge circuit for generating an output substantially linearly related to loads applied to the spring element, said circuit comprising four similar strain gauging means operatively attached to a surface of said spring element and connected to define a four-arm bridge network having input and output diagonals, and a correcting strain gauging means connected serially with one of said diagonals and operatively attached to a spring element surface and generating a variable series impedance in accordance with loads applied to said spring element.

2. A strain gauge transducer network for load cells having a spring element exhibiting surface area strains which are related in magnitude and sign to externally applied loads, said network including first, second, third and fourth serially connected bridge arms comprising similar active strain gauges attached to strained surface areas of the spring element, an input diagonal circuit, and an output diagonal circuit, the strain gauges of said first and third arms sensing load strains of the same sign as that of loads applied to the spring element, the strain gauges of said second and fourth arms sensing strains opposite to that of the load strains, and serially connected with said input diagonal a correcting strain gauge means having a negative temperature coefficient of resistivity and a positive strain sensitivity attached to said spring element and sensing strains opposite in sign to that of the load strains, whereby transducer output non-linearities due to spring element cross-sectional and modulus of elasticity variations are simultaneously corrected.

3. The network of claim 2 wherein said correcting strain gauge means comprises two similar nickel alloy strain gauges, serially connected at opposite sides of said bridge in said input diagonal circuit.

References Cited in the file of this patent
UNITED STATES PATENTS 2,350,972  Ruge _____ June 6, 1944

Notice of Adverse Decision in Interference

In Interference No. 93,056 involving Patent No. 3,034,346, J. E. Starr, Compensation of strain gauge transducer non-linearity, final decision adverse to the patentee was rendered Sept. 9, 1963, as to claim 1.

[*Official Gazette November 12, 1963.*]